UNITED STATES PATENT OFFICE.

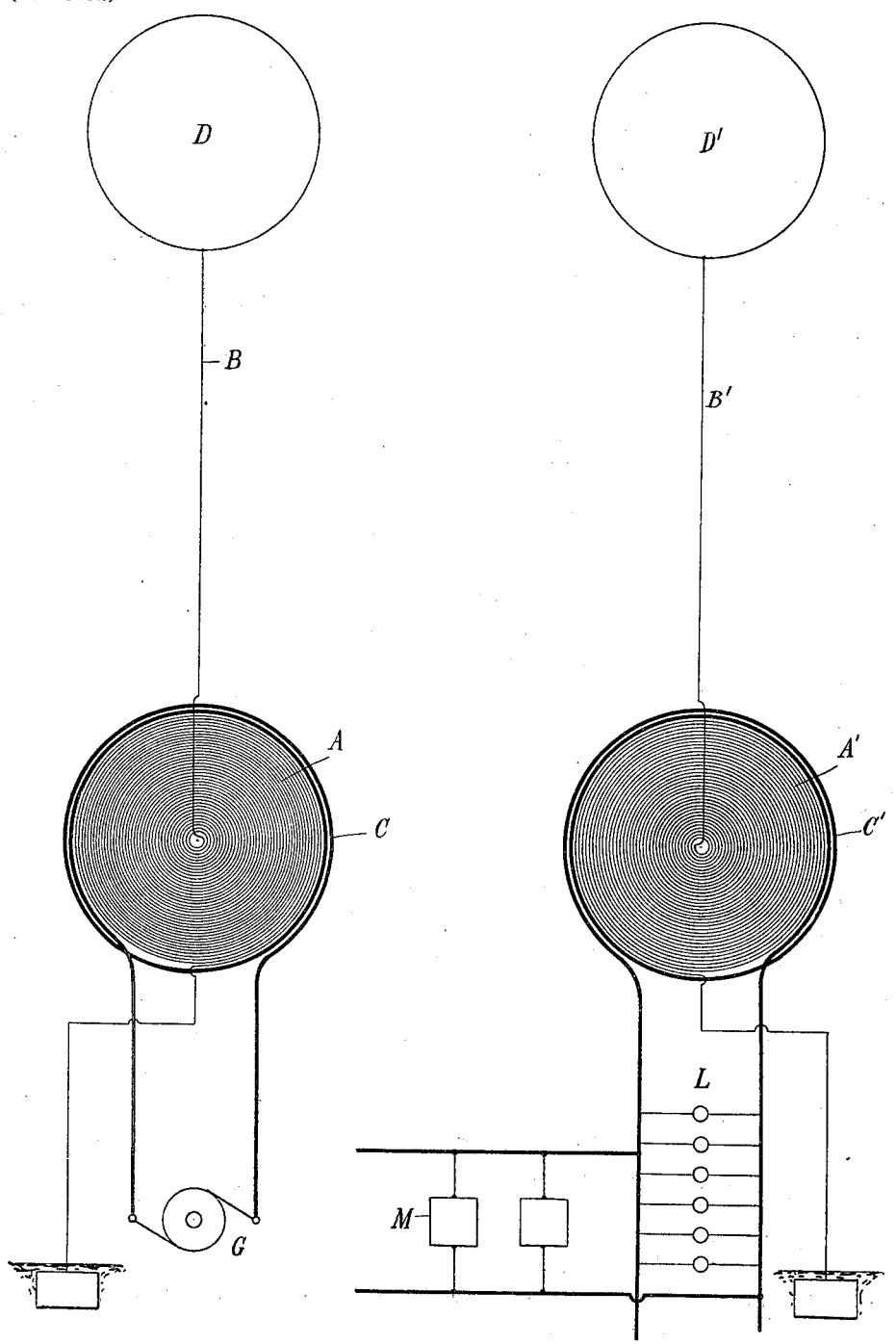

NIKOLA TESLA, OF NEW YORK, N. Y.

APPARATUS FOR TRANSMISSION OF ELECTRICAL ENERGY.

SPECIFICATION forming part of Letters Patent No. 649,621, dated May 15, 1900.

Original application filed September 2, 1897, Serial No. 650,343. Divided and this application filed February 19, 1900. Serial No. 5,780. (No model.)

*To all whom it may concern:*

Be it known that I, NIKOLA TESLA, a citizen of the United States, residing at the borough of Manhattan, in the city of New York, county and State of New York, have invented certain new and useful Improvements in Apparatus for the Transmission of Electrical Energy, of which the following is a specification, reference being had to the drawing accompanying and forming a part of the same.

This application is a division of an application filed by me on September 2, 1897, Serial No. 650,343, entitled "Systems of transmissions of electrical energy," and is based upon new and useful features and combinations of apparatus shown and described in said application for carrying out the method therein disclosed and claimed.

The invention which forms the subject of my present application comprises a transmitting coil or conductor in which electrical currents or oscillations are produced and which is arranged to cause such currents or oscillations to be propagated by conduction through the natural medium from one point to another remote therefrom and a receiving coil or conductor at such distant point adapted to be excited by the oscillations or currents propagated from the transmitter.

This apparatus is shown in the accompanying drawing, which is a diagrammatic illustration of the same.

A is a coil, generally of many turns and of a very large diameter, wound in spiral form either about a magnetic core or not, as may be desired. C is a second coil formed by a conductor of much larger size and smaller length wound around and in proximity to the coil A.

The apparatus at one point is used as a transmitter, the coil A in this case constituting a high-tension, secondary, and the coil C the primary, of much lower tension, of a transformer. In the circuit of the primary C is included a suitable source of current G. One terminal of the secondary A is at the center of the spiral coil, and from this terminal the current is led by a conductor B to a terminal D, preferably of large surface, formed or maintained by such means as a balloon at an elevation suitable for the purposes of transmission. The other terminal of the secondary A is connected to earth, and, if desired, to the primary also, in order that the latter may be at substantially the same potential as the adjacent portions of the secondary, thus insuring safety. At the receiving-station a transformer of similar construction is employed; but in this case the longer coil A' constitutes the primary, and the shorter coil C' the secondary, of the transformer. In the circuit of the latter are connected lamps L, motors M, or other devices for utilizing the current. The elevated terminal D' connects with the center of the coil A', and the other terminal of said coil is connected to earth and preferably, also, to the coil C' for the reasons above stated.

The length of the thin wire coil in each transformer should be approximately one-quarter of the wave length of the electric disturbance in the circuit, this estimate being based on the velocity of propagation of the disturbance through the coil itself and the circuit with which it is designed to be used. By way of illustration, if the rate at which the current traverses the circuit including the coil be one hundred and eighty-five thousand miles per second then a frequency of nine hundred and twenty-five per second would maintain nine hundred and twenty-five stationary moves in a circuit one hundred and eighty-five thousand miles long and each wave would be two hundred miles in length.

For such a low frequency, which would be resorted to only when it is indispensable for the operation of motors of the ordinary kind under the conditions above assumed, I would use a secondary of fifty miles in length. By such an adjustment or proportioning of the length of wire in the secondary coil or coils the points of highest potential are made to coincide with the elevated terminals D D', and it should be understood that whatever length be given to the wires this requirement should be complied with in order to obtain the best results.

It will be readily understood that when the above-prescribed relations exist the best conditions for resonance between the transmitting and receiving circuits are attained, and owing to the fact that the points of highest potential in the coils or conductors A A' are coincident with the elevated terminals the maximum flow of current will take place in the two coils, and this, further, necessarily implies that the capacity and inductance in each of the circuits have such values as to secure the most perfect condition of synchronism with the impressed oscillations.

When the source of current G is in operation and produces rapidly pulsating or oscillating currents in the circuit of coil C, corresponding induced currents of very much higher potential are generated in the secondary coil A, and since the potential in the same gradually increases with the number of turns toward the center and the difference of potential between the adjacent turns is comparatively small a very high potential impracticable with ordinary coils may be successively obtained.

As the main object for which the apparatus is designed is to produce a current of excessively-high potential, this object is facilitated by using a primary current of very considerable frequency; but the frequency of the currents is in a large measure arbitrary, for if the potential be sufficiently high and the terminals of the coils be maintained at the proper elevation where the atmosphere is rarefied the stratum of air will serve as a conducting medium for the current produced and the latter will be transmitted through the air, with, it may be, even less resistance than through an ordinary conductor.

As to the elevation of the terminals D D', it is obvious that this is a matter which will be determined by a number of things, as by the amount and quality of the work to be performed, by the condition of the atmosphere, and also by the character of the surrounding country. Thus if there be high mountains in the vicinity the terminals should be at a greater height, and generally they should always be at an altitude much greater than that of the highest objects near them. Since by the means described practically any potential that is desired may be produced, the currents through the air strata may be very small, thus reducing the loss in the air.

The apparatus at the receiving-station responds to the currents propagated from the transmitter in a manner which will be well understood from the foregoing description. The primary circuit of the receiver—that is, the thin wire coil A'—is excited by the currents propagated by conduction through the intervening natural medium from the transmitter, and these currents induce in the secondary coil C' other currents which are utilized for operating the devices included in the circuit thereof.

Obviously the receiving-coils, transformers, or other apparatus may be movable—as, for instance, when they are carried by a vessel floating in the air or by a ship at sea. In the former case the connection of one terminal of the receiving apparatus to the ground might not be permanent, but might be intermittently or inductively established without departing from the spirit of my invention.

It is to be noted that the phenomenon here involved in the transmission of electrical energy is one of true conduction and is not to be confounded with the phenomena of electrical radiation which have heretofore been observed and which from the very nature and mode of propagation would render practically impossible the transmission of any appreciable amount of energy to such distances as are of practical importance.

What I now claim as my invention is—

1. The combination with a transmitting coil or conductor connected to ground and to an elevated terminal respectively, and means for producing therein electrical currents or oscillations, of a receiving coil or conductor similarly connected to ground and to an elevated terminal, at a distance from the transmitting-coil and adapted to be excited by currents caused to be propagated from the same by conduction through the intervening natural medium, a secondary conductor in inductive relation to the receiving-conductor and devices for utilizing the current in the circuit of said secondary conductor, as set forth.

2. The combination with a transmitting coil or conductor having its ends connected to ground and to an elevated terminal respectively, a primary coil in inductive relation thereto and a source of electrical oscillations in said primary circuit, of a receiving conductor or coil having its ends connected to ground and to an elevated terminal respectively and adapted to be excited by currents caused to be propagated from the transmitter through the natural medium and a secondary circuit in inductive relation to the receiving-circuit and receiving devices connected therewith, as set forth.

3. The combination with a transmitting instrument comprising a transformer having its secondary connected to ground and to an elevated terminal respectively, and means for impressing electrical oscillations upon its primary, of a receiving instrument comprising a transformer having its primary similarly connected to ground and to an elevated terminal, and a translating device connected with its secondary, the capacity and inductance of the two transformers having such values as to secure synchronism with the impressed oscillations, as set forth.

4. The combination with a transmitting instrument comprising an electrical transformer having its secondary connected to ground and to an elevated terminal respectively, and means for impressing electrical oscillations upon its primary, of a receiving instrument comprising a transformer having its primary similarly connected to ground and to an elevated terminal, and a translating device connected with its secondary, the capacity and inductance of the secondary of the transmitting and primary of the receiving instruments having such values as to secure synchronism with the impressed oscillations, as set forth.

5. The combination with a transmitting coil or conductor connected to ground and an elevated terminal respectively, and means for producing electrical currents or oscillations in the same, of a receiving coil or conductor similarly connected to ground and to an elevated terminal and synchronized with the transmitting coil or conductor, as set forth.

6. The combination with a transmitting instrument comprising an electrical transformer, having its secondary connected to ground and to an elevated terminal respectively, of a receiving instrument comprising a transformer, having its primary similarly connected to ground and to an elevated terminal, the receiving-coil being synchronized with that of the transmitter, as set forth.

7. The combination with a transmitting coil or conductor connected to ground and to an elevated terminal respectively, and means for producing electrical currents or oscillations in the same, of a receiving coil or conductor similarly connected to ground and to an elevated terminal, the said coil or coils having a length equal to one-quarter of the wave length of the disturbance propagated, as set forth.

8. The combination with a transmitting coil or conductor connected to ground and to an elevated terminal respectively, and adapted to cause the propagation of currents or oscillations by conduction through the natural medium, of a receiving-circuit similarly connected to ground and to an elevated terminal, and of a capacity and inductance such that its period of vibration is the same as that of the transmitter, as set forth.

9. The transmitting or receiving circuit herein described, connected to ground and an elevated terminal respectively, and arranged in such manner that the elevated terminal is charged to the maximum potential developed in the circuit, as set forth.

10. The combination with a transmitting coil or conductor connected to ground and to an elevated terminal respectively of a receiving-circuit having a period of vibration corresponding to that of the transmitting-circuit and similarly connected to ground and to an elevated terminal and so arranged that the elevated terminal is charged to the highest potential developed in the circuit, as set forth.

NIKOLA TESLA.

Witnesses:
   PARKER W. PAGE,
   MARCELLUS BAILEY.